July 17, 1951 — A. C. SHAFER — 2,561,237
FISHING DEVICE
Filed Jan. 6, 1949
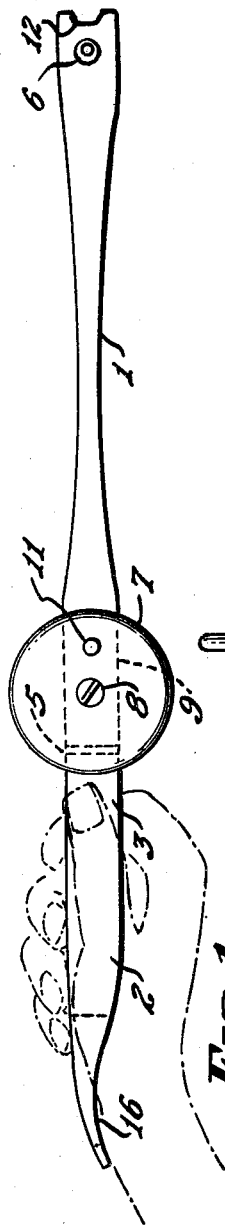
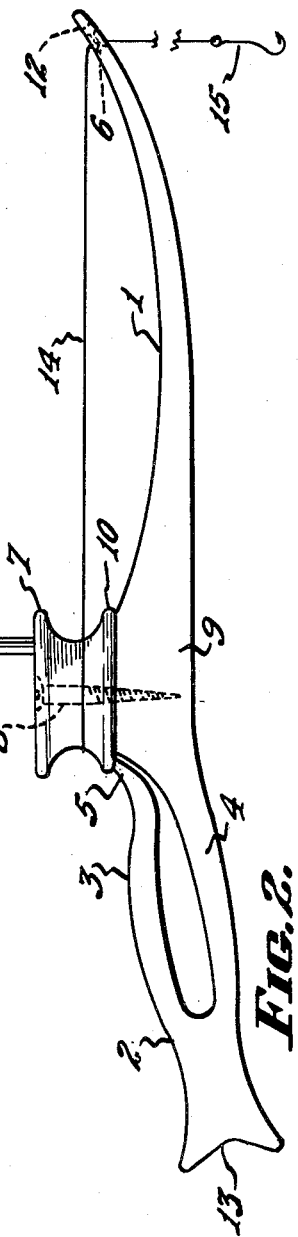
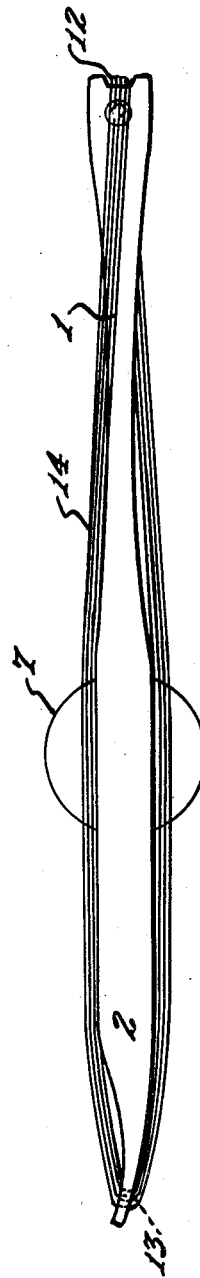
INVENTOR.
ARTHUR C. SHAFER,
BY
ATTORNEYS.

Patented July 17, 1951

2,561,237

UNITED STATES PATENT OFFICE 2,561,237

FISHING DEVICE

Arthur C. Shafer, Cincinnati, Ohio

Application January 6, 1949, Serial No. 69,515

2 Claims. (Cl. 43—23)

My invention relates to a fishing device in the nature of a fishing rod and line storage reel.

In still fishing, it is sometimes the practice to use an ordinary hand line. This is particularly convenient since it may be carried in the pocket or easily placed in an automobile when touring. However, a hand line has numerous disadvantages over a fishing rod and reel and the hand line after it has become wet from fishing is difficult to conveniently dry and restore for further use.

It is an object of my invention to provide a fishing device which has some of the advantages of a short fishing rod, together with a reel but which may be easily and conveniently carried in an automobile or in a knapsack or the like when on trips, but which may be quickly used for fishing at any time.

It is a further object of my invention to provide a fishing device described as above but which incorporates means for drying the wet fishing line after use so it may be easily returned to the storage reel for packing.

It is another object of my invention to provide a fishing rod and reel which may be relatively inexpensive to manufacture, pleasing in appearance and having a configuration which makes it very handy to use.

It is a further object of my invention to provide a fishing device which may be conveniently used by children or carried around in a car during touring and which will be available at all times for use. These and other objects of my invention which will be set forth hereinafter or will be apparent to one skilled in the art upon reading these specifications, I accomplish by that certain construction and arrangement of parts of which I shall now describe an exemplary embodiment. Reference is now made to the drawings which form a part hereof and in which:

Figure 1 is a plan view of my novel fishing device with the hand of the user shown in broken lines.

Figure 2 is a side elevation of my novel fishing device.

Figure 3 is a plan view of my novel fishing device taken from the bottom with the fish line wrapped around the device.

Briefly, in the practice of my invention, I provide a short fishing rod which has a bifurcated hand grip with one prong forming the rod. A spool in the form of a reel is mounted on the prong which constitutes the rod and in such a manner that the flange of the reel is in resilient contact with the outside end of the other prong of the bifurcated hand grip, so that the reel will only rotate when the prongs are squeezed together. The reel is primarily designed for merely storing the line and not for playing the fish, and is normally only moved when the line is to be shortened or lengthened.

The configuration of the hand grip is such that it molds itself to the palm of the hand, permitting the thumb to rest on the short prong, while the tail or rear end of the hand grip is configured to conform to the heel of the hand and thus the grip on the device is comfortable and is not apt to tire the user.

When the fishing has been completed, the wet line may be removed from the reel and longitudinally wound around the whole device since I have provided notches at each end to hold the line in position. After the line has become dried, it may be wound on the reel for storage.

The handle and rod portion is preferably integral and is preferably formed of wood or plastic. However, I do not intend to limit myself to the specific material out of which my device is made, since numerous materials would be satisfactory.

Referring to the drawings, I provide an integral member preferably cut from a single piece of wood or moulded of plastic and which consists of the rod portion 1 and the handle portion 2. The handle portion 2 is bifurcated and consists of a short upper prong 3 and a lower prong 4. The lower prong 4 passes the end 5 of the upper prong 3 and, in effect, forms the rod portion 1 in which a line carrying eye 6 is placed.

Mounted on the lower prong 4 is a reel or spool 7. This reel is preferably mounted on a screw 8 as an axle which is screwed into the thickened portion 9 of the lower prong 4. The prongs 3 and 4 are so arranged and the position of the reel 7 is such that the outer end of the shorter prong 3 resiliently bears against the flange 10 of the reel 7. This prevents the reel 7 from turning unless the prongs 3 and 4 are squeezed together, in which event the end 5 of the shorter prong 3 is released from contact with the flange 10 of the reel 7 and permits the reel to freely turn. The reel 7, of course, may be turned against the friction of the end of the prong 3 on the flange 10 of the reel by means of a turning handle 11 incorporated in the reel.

On the end of the rod portion 1, I provide a notch 12, while on the tail or end of the hand gripping portion 2, I provide an oppositely disposed notch 13. In the drawings, I have indicated the handle portion 2 somewhat in the shape of a fish with the tail or end of the handle carrying the notch 13 in the form of a fish's tail.

In use, the line 14 which is normally carried by the reel 7 is threaded through the eye 6 and the hook 15 placed thereon; as much as the line 14 is unwound from the reel 7, as is desirable. This unreeling or unwinding may be done against the resilient friction of the prong end 5 against the flange of the reel or the reel may be made to run free by squeezing the prongs 3 and 4 together.

The grip portion of the device is held as shown in Figure 1 with the hand comfortably wrapped around the two prongs 3 and 4 with the thumb on the short prong 3. The tail portion has a concavity 16 which comfortably embraces the heel of the hand.

If a fish is caught, it may be pulled in by reeling the line on the reel 7, although it may be easier to merely pull in the line hand over hand as would be the procedure with a normal type hand line. When the fishing is over, the wet line is wrapped around the length of the rod as shown in Figure 3. The line is held in place by the notch 12 in the tip of the rod and the notch 13 in the tail of the handle. Of course, in this position, the rod may be easily replaced in the car or in a knapsack and as soon as the line becomes dry, it may be replaced upon the reel 7.

From the above, it is apparent that I have provided a compact, inexpensive fishing device which has a line carrying reel and a short rod and which also incorporates a line drying rack.

It is to be understood that modifications may be made in my invention without departing from the spirit thereof and I do not intend to limit myself otherwise than as pointed out in the claims which follow.

Having thus described my invention, what I claim as new and desire to secure by Letters Patent is:

1. A fishing device comprising a one piece bifurcated hand grip, one prong of which extends beyond the other prong to form a rod and in spaced relation therewith, a line storing reel carrying a fishing line mounted on the extending prong with the exterior face of the flange of the reel in frictional contact with the face of the free end of the other prong, so that the reel will only freely rotate when the prongs are squeezed together.

2. A fishing device comprising a one piece bifurcated hand grip, one prong of which extends beyond the other prong to form a rod and in spaced relation therewith, a line storing reel carrying a fishing line mounted on the extending prong with a portion of the flange of the reel in frictional contact with the face of the free end of the other prong, so that the reel will only freely rotate when the prongs are squeezed together.

ARTHUR C. SHAFER.

REFERENCES CITED

The following references are of record in the file of this patent:

UNITED STATES PATENTS

| Number | Name | Date |
|---|---|---|
| D. 157,196 | Shafer | Mar. 21, 1950 |
| 733,836 | Hall | July 14, 1903 |
| 1,227,273 | King | May 22, 1917 |
| 1,607,285 | Krimblebine | Nov. 16, 1926 |
| 1,634,436 | Polson | July 5, 1927 |

FOREIGN PATENTS

| Number | Country | Date |
|---|---|---|
| 34,021 | Sweden | Dec. 18, 1912 |